(12) United States Patent
He et al.

(10) Patent No.: US 12,319,862 B2
(45) Date of Patent: Jun. 3, 2025

(54) METHOD FOR PREPARING A COATED ARTICLE

(71) Applicant: Transitions Optical, Ltd., Tuam (IE)

(72) Inventors: Meng He, South Elgin, IL (US); Anil Kumar, Murrysville, PA (US); Brad S. Veldkamp, Allison Park, PA (US); Robin Lee Evans, Denton, TX (US)

(73) Assignee: Transitions Optical, Ltd., Tuam (IE)

( * ) Notice: Subject to any disclaimer, the term of this patent is extended or adjusted under 35 U.S.C. 154(b) by 4 days.

(21) Appl. No.: 18/035,977

(22) PCT Filed: Nov. 10, 2020

(86) PCT No.: PCT/EP2020/081615
§ 371 (c)(1),
(2) Date: May 9, 2023

(87) PCT Pub. No.: WO2022/100815
PCT Pub. Date: May 19, 2022

(65) Prior Publication Data
US 2023/0416609 A1    Dec. 28, 2023

(51) Int. Cl.
*C09K 19/60*    (2006.01)
*C09K 19/54*    (2006.01)
*G02B 1/04*    (2006.01)

(52) U.S. Cl.
CPC .............. *C09K 19/60* (2013.01); *C09K 19/54* (2013.01); *G02B 1/041* (2013.01); *C09K 2219/03* (2013.01)

(58) Field of Classification Search
CPC ...................................................... C09K 19/60
See application file for complete search history.

(56) References Cited

U.S. PATENT DOCUMENTS

| 3,361,706 A | 1/1968 | Meriwether |
| 4,166,043 A | 8/1979 | Uhlmann et al. |

(Continued)

FOREIGN PATENT DOCUMENTS

| CN | 106371163 A | 2/2017 |
| CN | 110612476 A | 12/2019 |

(Continued)

OTHER PUBLICATIONS

CIBA Irgacure 819, pp. 1-2, (2024) (Year: 2024).*

(Continued)

*Primary Examiner* — Chanceity N Robinson
(74) *Attorney, Agent, or Firm* — The Webb Law Firm

(57) ABSTRACT

A method for preparing a coated article which includes: (a) providing a substrate; (b) applying a photo-polymerizable coating composition to at least a portion of the substrate, where the photo-polymerizable coating composition includes a photo-polymerizable anisotropic material, and a photoinitiator; (c) ordering the anisotropic material present in the photo-polymerizable coating composition; and (d) exposing the ordered photo-polymerizable coating composition of (c) to a light emitting diode light source having a peak emission wavelength ranging from 385 to 460 nanometers to cure the photo-polymerizable coating composition is provided herein. The photoinitiator is capable of activation at the emission wavelength of the light emitting diode light source.

14 Claims, 1 Drawing Sheet

(56) References Cited

U.S. PATENT DOCUMENTS

| | | |
|---|---|---|
| 4,367,170 A | 1/1983 | Uhlmann et al. |
| 4,731,264 A | 3/1988 | Lin et al. |
| 4,756,973 A | 7/1988 | Sakagami et al. |
| 4,931,220 A | 6/1990 | Haynes et al. |
| 5,134,191 A | 7/1992 | Takarada et al. |
| 5,166,345 A | 11/1992 | Akashi et al. |
| 5,231,156 A | 7/1993 | Lin |
| 5,236,958 A | 8/1993 | Miyashita |
| 5,252,742 A | 10/1993 | Miyashita |
| 5,327,271 A | 7/1994 | Takeuchi et al. |
| 5,359,085 A | 10/1994 | Iwamoto et al. |
| 5,462,806 A | 10/1995 | Konishi et al. |
| 5,488,119 A | 1/1996 | Fischer-Reimann et al. |
| 5,658,501 A | 8/1997 | Kumar et al. |
| 5,821,287 A | 10/1998 | Hu et al. |
| 5,962,617 A | 10/1999 | Slagel |
| 6,113,814 A | 9/2000 | Gemert et al. |
| 6,555,028 B2 | 4/2003 | Walters et al. |
| 7,256,921 B2 | 8/2007 | Kumar et al. |
| 7,452,611 B2 | 11/2008 | Blackburn et al. |
| 8,582,192 B2 | 11/2013 | Kumar et al. |
| 9,030,740 B2 | 5/2015 | DeMeio et al. |
| 9,334,439 B2 | 5/2016 | DeMeio et al. |
| 9,475,901 B2 | 10/2016 | Saha et al. |
| 9,726,887 B2 * | 8/2017 | Fleck .................. G02B 27/017 |
| 10,670,787 B2 | 6/2020 | Kasai et al. |
| 11,378,838 B2 | 7/2022 | Shibata et al. |
| 2012/0002141 A1 * | 1/2012 | Dai ....................... C09K 19/60 |
| | | 252/299.5 |
| 2018/0148648 A1 * | 5/2018 | Smith .................... C07C 69/80 |
| 2018/0282463 A1 * | 10/2018 | Tamura ................. C08F 265/06 |
| 2020/0255736 A1 * | 8/2020 | Mulcahy ................ C09K 19/54 |
| 2020/0326590 A1 | 10/2020 | Shibata et al. |
| 2021/0003867 A1 | 1/2021 | Takenaka et al. |

FOREIGN PATENT DOCUMENTS

| | | | | |
|---|---|---|---|---|
| CN | 111527424 A | 8/2020 | | |
| WO | 9420581 A1 | 9/1994 | | |
| WO | 9705213 A1 | 2/1997 | | |
| WO | WO-2018206524 A1 * | 11/2018 | ............ | G02F 1/137 |
| WO | 2019181903 A1 | 9/2019 | | |

OTHER PUBLICATIONS

"Electronics Assembly: UV Light-Curable Adhesives, Coatings, Masking Resins, and Encapsulants for Electronic Assembly", Dymax Corporation, 2016, pp. 1-16.

* cited by examiner

METHOD FOR PREPARING A COATED ARTICLE

CROSS-REFERENCE TO RELATED APPLICATION

This application is the United States national phase of International Application No. PCT/EP2020/081615 filed Nov. 10, 2020, the disclosure of which is hereby incorporated by reference in its entirety.

FIELD

The present invention relates to a method for preparing a coated article, in particular a coated optical article, employing a photo-polymerizable coating composition and a light emitting diode light source for curing the composition.

BACKGROUND

Photochromic coatings, including photochromic-dichroic coatings, for a variety of optical elements are well known. Such photochromic coatings are those having an absorption spectrum for at least visible radiation that varies in response to absorption of at least actinic radiation. Photochromic materials used in these photochromic coatings can include thermally reversible photochromic materials and compounds and non-thermally reversible photochromic materials and compounds. Thermally reversible photochromic materials/compounds are capable of converting from a first state, for example a "clear state", to a second state, for example a "colored state", in response to actinic radiation, and reverting back to the first state in response to thermal energy. The non-thermally reversible photochromic compounds/materials are compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

Likewise, photochromic-dichroic compounds/materials are known for use in the aforementioned photochromic coatings. Such photochromic-dichroic compounds/materials are those possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

Further, dichroic compounds/materials are those capable of absorbing one of two orthogonal plane polarized components of at least transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. Thus, it is generally necessary to suitably position or arrange the molecules of the dichroic material (as well as the photochromic-dichroic material) by alignment with another material in order to achieve a net linear polarization.

Compositions comprising photo-polymerizable anisotropic materials, such as photo-polymerizable liquid crystal materials, are known and reported in the art. Anisotropic materials are materials having at least one property that differs in value when measured in at least one different direction. Liquid crystal materials, because of their structure, generally are capable of being ordered or aligned so as to take on a general direction. Thus, liquid crystal molecules can be ordered or aligned by interaction with an external force or another structure such that the long axis of the molecules takes on an orientation that is generally parallel to a common axis.

Thermal curing techniques for curing of any of the aforementioned coatings are well known in the art. However, when employed for the curing of coatings comprising anisotropic materials, such as liquid crystal materials, thermal curing techniques have proven unsatisfactory because thermal cure temperatures can disrupt the desired alignment of the anisotropic materials during the thermal curing process.

Photo-induced curing processes for photochromic and photochromic-dichroic coatings using an ultraviolet light source are known. Also, it is known to use light filters to modify the output of broadband light sources during curing processes for photochromic and photochromic-dichroic coatings comprising liquid crystal coatings. Likewise, the use of narrower band light emitting diodes for curing photochromic coatings has been reported.

Obtaining acceptable "through-cure" for photochromic and photochromic-dichroic coatings using the photo-induced curing techniques mentioned above can be challenging due to the light absorbance properties of the photochromic and photochromic-dichroic dyes present in the coating. The photochromic materials absorb the light as it passes through the coating layer during the photo-induced curing process, thereby effectively blocking the light absorbance of the photoinitiator. Thus, uniform photo-induced curing throughout the coating layer is inhibited. Additionally, curing of photochromic and photochromic-dichroic coatings using ultraviolet light sources often results in a yellowing of the resulting coating layer.

In view of the foregoing, it would be desirable to provide a method for obtaining sufficient through-cure of photochromic and photochromic-dichroic coatings, especially those coatings comprising anisotropic materials, while avoiding yellowing of the resulting coatings and maintaining alignment of the anisotropic materials throughout the curing process.

SUMMARY

The present invention is directed to a method for preparing a coated article. The method comprises:
(a) providing a substrate;
(b) applying a photo-polymerizable coating composition to at least a portion of the substrate, the photo-polymerizable coating composition comprising:
  (1) a photo-polymerizable anisotropic material, and
  (2) a photoinitiator;
(c) ordering the anisotropic material present in the photo-polymerizable coating composition; and
(d) exposing the ordered photo-polymerizable coating composition of (c) to a light emitting diode light source having a peak emission wavelength ranging from 385 to 460 nanometers to cure the photo-polymerizable coating composition.

The photoinitiator is capable of activation at the peak emission wavelength of the light emitting diode light source.

DETAILED DESCRIPTION

Figure 1:
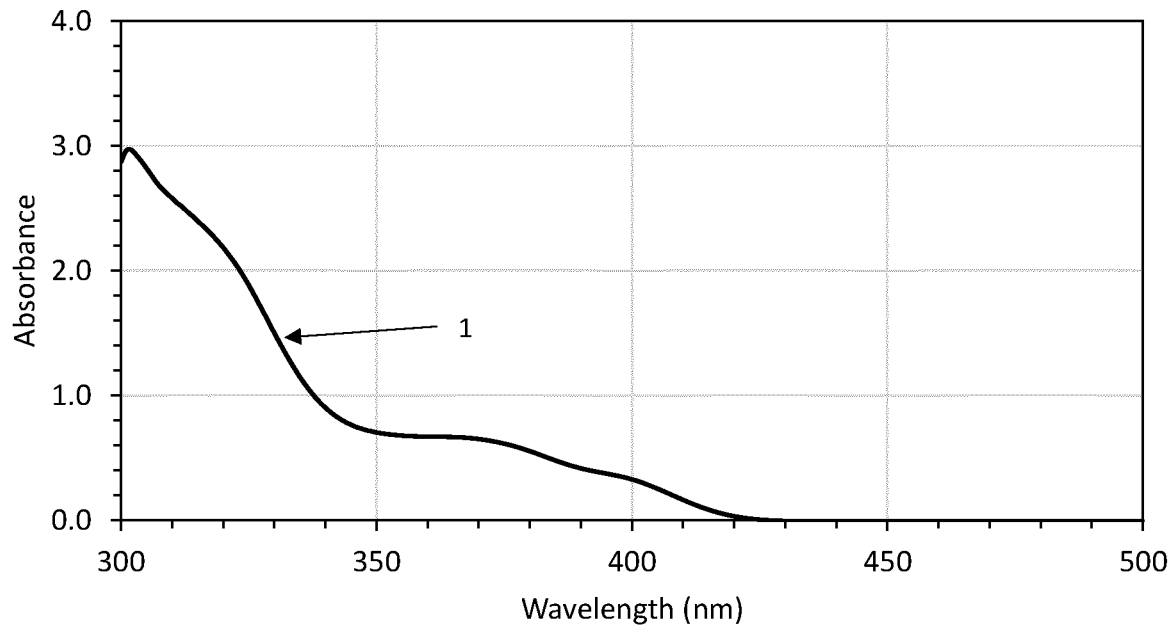
FIG. 1 depicts the absorbance spectrum (Spectrum 1) of a mixture of three photochromic-dichroic indeno-fused naphthopyran dyes, in anisole, in the unactivated state.

As used herein, the articles "a", "an", and "the" include plural referents unless otherwise expressly and unequivocally limited to one referent.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of that is, all subranges or sub-ratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. For example, unless specified otherwise herein, the term "(meth)acrylic acid" includes methacrylic acid and/or acrylic acid.

As used herein, the term "photochromic" and similar terms, such as "photochromic compound", means a compound or material having an absorption spectrum for at least visible radiation that varies in response to absorption of at least actinic radiation. Further, as used herein, the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein, the term "photochromic-dichroic" and similar terms, such as "photochromic-dichroic compound", means possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, the photochromic compounds of the present invention can have a different absorption spectrum in each of the first and second states. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to various orientations of the invention as may be described further herein, such as articles and multilayer articles of the present invention. It is to be understood, however, that the invention can assume various alternative orientations to those described herein and, accordingly, such terms are not to be considered as limiting.

As used herein, the terms "formed over", "deposited over", "provided over", "applied over", residing over", or "positioned over", mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

The term "alkyl" as used herein means linear or branched alkyl, such as but not limited to linear or branched $C_1$-$C_{25}$ alkyl, or linear or branched $C_1$-$C_{10}$ alkyl, or linear or branched $C_2$-$C_{10}$ alkyl. Representative alkyl groups can include, but are not limited to, methyl, ethyl, propyl, isopropyl, butyl, isobutyl, sec-butyl, tert-butyl, pentyl, neopentyl, hexyl, heptyl, octyl, nonyl and decyl.

The term "cycloalkyl" as used herein means groups that are appropriately cyclic, such as but not limited to $C_3$-$C_{12}$ cycloalkyl (including, but not limited to, cyclic $C_5$-$C_7$ alkyl) groups. Examples of cycloalkyl groups include those recited previously herein. The term "cycloalkyl" as used herein also includes: bridged ring polycycloalkyl groups (or bridged ring polycyclic alkyl groups), such as but not limited to bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

As previously mentioned, the present invention is directed to a method for preparing a coated article, the method comprising:
(a) providing a substrate;
(b) applying a photo-polymerizable coating composition to at least a portion of the substrate, the photo-polymerizable coating composition comprising:
(1) a photo-polymerizable anisotropic material, and
(2) a photoinitiator;
(c) ordering the anisotropic material present in the photo-polymerizable coating composition; and
(d) exposing the ordered photo-polymerizable coating composition of (c) to a light emitting diode light source having a peak emission wavelength ranging from 385 to 460 nanometers to cure the photo-polymerizable coating composition,
wherein the photoinitiator is capable of activation at the peak emission wavelength of the light emitting diode light source.

Non-limiting examples of suitable substrates for use in the method of the present invention include substrates formed from organic materials, inorganic materials, or combinations thereof (for example, composite materials). Specific, non-limiting examples of organic materials that may be used to form the substrates disclosed herein include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference.

For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

While not limiting herein, the substrate can be an optical substrate such as an ophthalmic substrate. As used herein, the term "ophthalmic substrate" means lenses, partially formed lenses, and lens blanks. Non-limiting examples of organic materials suitable for use in forming ophthalmic substrates can include, but are not limited to, the art-recognized polymers that are useful as ophthalmic substrates, e.g., organic optical resins that are used to prepare optically clear castings for optical applications, such as ophthalmic lenses.

Other non-limiting examples of organic materials suitable for use in forming the substrates can include both synthetic and natural organic materials, including without limitation: opaque or translucent polymeric materials, natural and synthetic textiles, and cellulosic materials such as paper and wood.

Non-limiting examples of inorganic materials suitable for use in forming the substrates useful in the method of the present invention can include glasses, minerals, ceramics, and metals. For example, the substrate can comprise glass. Also, the substrate can have a reflective surface, for example, a polished ceramic substrate, metal substrate, or mineral substrate. A reflective coating or layer can be deposited or otherwise applied to a surface of an inorganic or an organic substrate to make it reflective or to enhance its reflectivity.

Further, as discussed herein below, the substrates may have a protective coating, such as, but not limited to, an abrasion-resistant coating, such as a "hard coat", on their exterior surfaces. Therefore, as used herein, the term "substrate" includes a substrate having a protective coating, such as but not limited to an abrasion-resistant coating, on its surface(s).

Still further, the substrates can be untinted, tinted, linearly polarizing, circularly polarizing, elliptically polarizing, photochromic, or tinted-photochromic substrates. As used herein with reference to substrates, the term "untinted" means substrates that are essentially free of coloring agent additions (such as, but not limited to, conventional dyes) and have an absorption spectrum for visible radiation that does not vary significantly in response to actinic radiation. Further, with reference to substrates, the term "tinted" means substrates that have a coloring agent addition (such as, but not limited to, conventional dyes) and an absorption spectrum for visible radiation that does not vary significantly in response to actinic radiation.

As used herein, the term "linearly polarizing" with reference to substrates refers to substrates that are adapted to linearly polarize radiation. As used herein, the term "circularly polarizing" with reference to substrates refers to substrates that are adapted to circularly polarize radiation. As used herein, the term "elliptically polarizing" with reference to substrates refers to substrates that are adapted to elliptically polarize radiation. As used herein, with the term "photochromic" with reference to substrates refers to substrates having an absorption spectrum for visible radiation that varies in response to at least actinic radiation. Further, as used herein with reference to substrates, the term "tinted-photochromic" means substrates containing a coloring agent addition as well as a photochromic material, and having an absorption spectrum for visible radiation that varies in response to at least actinic radiation. Thus, for example and without limitation, the tinted-photochromic substrate can have a first color characteristic of the coloring agent and a second color characteristic of the combination of the coloring agent the photochromic material when exposed to actinic radiation.

Generally, the substrate (a) comprises a polymeric material selected from the group consisting of polycarbonate, polycyclic alkene, polyurethane, poly(urea)urethane, polythiourethane, polythio(urea)urethane, poly(allyl carbonate) polymers, cellulose acetate, cellulose diacetate, cellulose triacetate, cellulose acetate propionate, cellulose acetate poly(vinylidene chloride), poly(ethylene terephthalate), polyester, polysulfone, polyolefin, copolymers thereof, and mixtures thereof.

As mentioned previously, in the method of the present invention a photo-polymerizable coating composition is applied to at least a portion of the substrate surface. The photo-polymerizable coating composition comprises (1) a photo-polymerizable anisotropic material, and (2) a photoinitiator.

As used herein, the term "anisotropic" means having at least one property that differs in value when measured in at least one different direction. Thus, "anisotropic materials" are materials that have at least one property that differs in value when measured in at least one different direction. Non-limiting examples of anisotropic materials that are suitable for use in the photo-polymerizable coating composition disclosed herein include liquid crystal materials, such as, but not limited to, photo-polymerizable liquid crystal materials.

Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, although not limiting herein, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface.

Non-limiting examples of liquid crystal materials suitable for use in the photo-polymerizable coating composition can include liquid crystal polymers, liquid crystal pre-polymers, liquid crystal monomers, and liquid crystal mesogens. As used herein, the term "pre-polymer" means partially polymerized materials.

Liquid crystal monomers that are suitable for use in the photo-polymerizable coating composition can include mono- as well as multi-functional liquid crystal monomers. Further, the liquid crystal monomer can be a photo-polymerizable liquid crystal monomer. As used herein, the term "photo-polymerizable" means a material, such as a monomer, a pre-polymer or a polymer, that can be cross-linked upon exposure to actinic radiation. For example, photo-polymerizable liquid crystal monomers can include those liquid crystal monomers that are cross-linkable upon exposure to ultraviolet radiation and/or visible radiation, either with or without the use of polymerization initiators.

Non-limiting examples of photo-polymerizable liquid crystal monomers suitable for use in the photo-polymerizable coating composition can include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof.

Photo-polymerizable liquid crystal polymers and pre-polymers that are suitable for use in the photo-polymerizable coating composition can include main-chain liquid crystal polymers and pre-polymers and side-chain liquid crystal polymers and pre-polymers. In main-chain liquid crystal polymers and pre-polymers, rod- or disc-like liquid crystal mesogens are primarily located within the polymer backbone. In side-chain polymers and pre-polymers, the rod- or disc-like liquid crystal mesogens primarily are located within the side chains of the polymer.

Non-limiting examples of photo-polymerizable liquid crystal polymers and pre-polymers that are suitable for use in the photo-polymerizable coating composition can include, but are not limited to, main-chain and side-chain polymers and pre-polymers having functional groups chosen from acrylates, methacrylates, alkynes, epoxides, thiols, and blends thereof.

Liquid crystals mesogens that are suitable for use in the photo-polymerizable coating composition can include thermotropic liquid crystal mesogens and lyotropic liquid crystal mesogens. Further, non-limiting examples of liquid crystal mesogens that are suitable for use in conjunction with various non-limiting embodiments disclosed herein include calamitic (or rod-like) liquid crystal mesogens and discotic (or disc-like) liquid crystal mesogens.

Mixtures of any of the aforementioned liquid crystal materials can be used.

The photo-polymerizable anisotropic material can be present in the photo-polymerizable coating composition in an amount ranging from 50 to 99.8 weight percent, such as 70 to 99.5 weight percent, or 85 to 99 weight percent, based on total weight of solids present in the photo-polymerizable coating composition.

As mentioned previously, the photo-polymerizable coating composition further comprises a photoinitiator. Suitable photoinitiator(s) can include those selected from the group consisting of phosphine based photoinitiators, benzoyl based photoinitiators, substituted benzoyl based photoinitiators, and mixtures thereof.

Non-limiting examples of suitable phosphine and benzoyl based photoinitiators can include phenylbis(2,4,6-trimethylbenzoyl)phosphine oxide, (2,4-dipentyloxyphenyl)bis(2,4,6-trimethylbenzoyl)phosphine oxide, (4-(dimethylamino)phenyl)bis(2,4,6-trimethylbenzoyl)phosphine oxide, diphenyl(2,4,6-dimethylbenzoyl)diphenylphosphine oxide, diphenyl(2,4,6-trimethylbenzoyl)phosphine oxide, (2,6-dichlorobenzoyl)diphenylphosphine oxide, (2,6-dimethoxybenzoyl)diphenylphosphine oxide, (2,4,6-trimethoxybenzoyl)diphenylphosphine oxide, (4-methoxybenzoyl)diphenylphosphine oxide, (4-(dimethylamino)benzoyl)diphenylphosphine oxide, bis(2,6-dimethoxybenzoyl)(2,4,4-trimethylpentyl)phosphine oxide, bis(2,6-dimethylbenzoyl)(2,4,4-trimethylpentyl)phosphine oxide, bis(2,4,6-trimethylbenzoyl)(2,4,4-trimethylpentyl)phosphine oxide, bis(2,6-dichlorobenzoyl)(2,4,4-trimethylpentyl)phosphine oxide, bis(2,6-dichlorobenzoyl)phenylphosphine oxide, bis(2,6-dichlorobenzoyl)(4-propylphenyl)phosphine oxide, dibenzoyl diethylgermane, and ethyl (2,4,6-trimethylbenzoyl)phenylphosphinate.

The photoinitiator can be present in the photo-polymerizable coating composition in an amount ranging from 10 to 0.1 weight percent, such as 5 to 0.3 weight percent, or 2 to 0.5 weight percent, based on total weight of solids present in the photo-polymerizable coating composition. It should be noted herein that the photoinitiator present in the photo-polymerizable coating composition should be capable of activation at the peak emission wavelength of the light emitting diode light source as discussed in detail herein below.

For certain applications, the photo-polymerizable coating composition can further comprise a material selected from the group consisting of a photochromic compound, a dichroic compound, a photochromic-dichroic compound, and mixtures thereof.

As mentioned previously, as used herein, the term "photochromic material" includes both thermally reversible and non-thermally reversible (or photo-reversible) photochromic compounds. Generally, although not limiting herein, when two or more photochromic materials are used in conjunction with each other or with a photochromic-dichroic compound (such as those described herein below), the various materials can be chosen to complement one another to produce a desired color or hue. For example, mixtures of photochromic compounds can be used to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic material can comprise any of a variety of organic and inorganic photochromic materials. The photochromic material(s) can include but is not limited to the following classes of materials: chromenes, e.g., naphthopyrans, benzopyrans, indenonaphthopyrans, phenanthropyrans or mixtures thereof; spiropyrans, e.g., spiro(benzindoline) naphthopyrans, spiro(indoline)benzopyrans, spiro(indoline) naphthopyrans, spiro(indoline)quinopyrans and spiro(indoline)pyrans; oxazines, e.g., spiro(indoline)naphthoxazines, spiro(indoline)pyridobenzoxazines, spiro(benzindoline) pyridobenzoxazines, spiro(benzindoline)naphthoxazines and spiro(indoline)benzoxazines; mercury dithizonates, fulgides, fulgimides and mixtures of such photochromic compounds.

Such photochromic materials and complementary photochromic materials are described in U.S. Pat. No. 4,931,220 at column 8, line 52 to column 22, line 40; 5,645,767 at column 1, line 10 to column 12, line 57; 5,658,501 at column 1, line 64 to column 13, line 17; 6,153,126 at column 2, line 18 to column 8, line 60; 6,296,785 at column 2, line 47 to column 31, line 5; 6,348,604 at column 3, line 26 to column 17, line and 6,353,102 at column 1, line 62 to column 11, line 64, the disclosures of the aforementioned patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Suitable photochromic materials also can include polymerizable photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,252,742 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymerizable photochromic compounds disclosed in WO 97/05213 and in U.S. Pat. No. 6,555,028 at column 1, line 16 to column 24, line 56. The disclosures of the aforementioned patents on polymerizable photochromic materials are incorporated herein by reference.

Other suitable photochromic materials can include organo-metal dithiozonates, e.g., (arylazo)-thioformic arylhydrazidates, e.g., mercury dithizonates which are described in, for example, U.S. Pat. No. 3,361,706 at column 2, line 27 to column 8, line 43; and fulgides and fulgimides, e.g., the 3-furyl and 3-thienyl fulgides and fulgimides, which are described in U.S. Pat. No. 4,931,220 at column 1, line 39 through column 22, line 41, the disclosures of which are incorporated herein by reference.

Further photochromic materials can include organic photochromic material resistant to the effects of a polymerization initiator when used. Such organic photochromic materials include photochromic compounds in admixture with a resinous material that has been formed into particles and encapsulated in metal oxides, which are described in U.S.

Pat. Nos. 4,166,043 and 4,367,170 at column 1, line 36 to column 7, line 12, which disclosure is incorporated herein by reference.

As mentioned previously, as used herein, the term "dichroic" means capable of absorbing one of two orthogonal plane polarized components of at least transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. That is, due to the random positioning of the molecules of the dichroic material, selective absorption by the individual molecules will cancel each other such that no net or overall linear polarizing effect is achieved. Thus, it is generally necessary to suitably position or arrange the molecules of the dichroic material by alignment with another material in order to achieve a net linear polarization.

Non-limiting examples of suitable conventional dichroic compounds include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthraquinone and (poly)anthroquinones, anthropyrimidinones, iodine and iodates. Also, the dichroic material can be a polymerizable dichroic compound. That is, the dichroic material can comprise at least one group that is capable of being polymerized (i.e., a "polymerizable group"). For example, although not limiting herein, the dichroic compound can have at least one alkoxy, polyalkoxy, alkyl, or polyalkyl substituent terminated with at least one polymerizable group.

As mentioned previously, as used herein, the term "photochromic-dichroic" and similar terms, such as "photochromic-dichroic compound", means possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

Examples of photochromic-dichroic compounds suitable for use in the photo-polymerizable coating compositions used in the method of the present invention can include, but are not limited, to those described in detail in U.S. Pat. No. 7,256,921 B2 at column 19, line 3, to column 66, line 60, which disclosure is incorporated herein by reference.

If included, the photochromic compound and/or the photochromic-dichroic compound generally are present in the photo-polymerizable coating composition in an amount at least sufficient so as to provide an article prepared from the composition with a desirable level of photochromic properties, which is referred to as a photochromic amount. When used, the amount of photochromic compound(s) and/or the photochromic-dichroic compound(s) present in the curable composition can range from 0.001 percent by weight to 40 percent by weight, or from 0.01 to 30 percent by weight, or from 0.1 to 20 percent by weight, or from 1 to 15 percent by weight, based on the total solids weight of photo-polymerizable coating composition (including the weight of the photochromic compound(s) and/or the photochromic-dichroic compounds, and inclusive of the recited values).

The photo-polymerizable coating compositions used in the method of the present invention optionally can contain additives such as, but not limited to, waxes for flow and wetting; plasticizers, thermoplastics, flow control agents, such as poly(2-ethylhexyl)acrylate; antioxidants, including mesogenic antioxidants; hindered amine light stabilizers, including mesogenic hindered amine light stabilizers; ultraviolet (UV) light absorbers, including mesogenic UV absorbers; ultraviolet light stabilizers; surfactants; adhesion promoters; fixed-tint dyes; and solvents. Examples of useful antioxidants include, but are not limited to, those available commercially from BASF under the trademarks IRGANOX and TINUVIN. These optional additives, when used, can be present in amounts up to 30 percent by weight, based on total solids weight of the photo-polymerizable coating composition (excluding solvent).

Commercially available plasticizer additives, include, but are not limited to, Benzoflex 9-88, Benzoflex 9-88 SG, Enhancer 400, Admex 6995, Admex 6187, Admex 760, and Admex 770, which are commercially available from Eastman Chemical Company; polybutadiene based plasticizers can include Polyvest 130, Polyvest MA75, Polyvest HT, Polyvest EP ST M, and Polyvest EP ST E-100, which are available commercially from Evonik; polymeric plasticizers can include D-1116, G-1701 MU, G-1643, G-1652 MU, G-1657 MS, G-1657 VS, G-1701 MU, and MD-1648, which are available commercially from Kraton Corporation. Commercially available thermoplastic polyurethanes (TPUs) additives also may be used.

As mentioned above, the photo-polymerizable coating compositions can further include one or more fixed-tint dyes. As used herein, the term "fixed-tint dye" and related terms, such as "fixed-colorant", "static colorant", "fixed dye", and "static dye", means dyes that are non-photosensitive materials, which do not physically or chemically respond to electromagnetic radiation with regard to the visually observed color thereof. The term "fixed-tint dye" and related terms as used herein does not include and is distinguishable from a photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the photo-polymerizable coating compositions of the present invention for purposes including, but not limited to, providing a coated article prepared from the photo-polymerizable coating composition with: at least a base (or first) color characteristic of the fixed-tint dye, when the photochromic compound (if used) is not activated; and optionally a second color characteristic of the combination of the fixed-tint dye and the photochromic compound when activated, such as by exposure to actinic radiation. The optional fixed-tint dye of the photo-polymerizable coating composition can comprise at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The photo-polymerizable coating compositions of the present invention can include solvents such as those selected from water, organic solvents, and combinations thereof. Classes of organic solvents that can be present in the curable photochromic compositions of the present invention include, but are not limited to, ketones, such as acetone, and methyl ethyl ketone; ethers, such as dimethyl ether and methyl ethyl ether; cyclic ethers, such as tetrahydrofuran and dioxane; esters, such as ethyl acetate, 2-butoxyethylacetate, ethyl lactate, ethylene carbonate and propylene carbonate, in particular 1,2-propanediol cyclic carbonate; nitrogen containing cyclic compounds, such as pyrrolidone, N-methyl-2-pyrrolidone, 1-butylpyrrolidin-2-one and 1,3-dimethyl-2- imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes, or Aromatic 150, which is a commercially available mixture of $C_9$-$C_{11}$ alkyl benzenes.

Solvent(s) can be present in the curable compositions of the present invention in an amount of from 5 to 95 percent by weight, or from 15 to 80 percent by weight, or from 20 to 60 percent by weight, in each case based on the total weight of the photo-polymerizable coating composition (including the weight of the solvent).

Any of the photo-polymerizable coating compositions described above can be applied to the substrate by any of the well-known art recognized coating application techniques. For example, the photo-polymerizable coating composition can be applied by an application method selected from the group consisting of spin coating, spray coating, ultrasonic spray coating, curtain coating, dip coating, roll coating, flow coating, wire coating, overlaying, and combinations thereof.

Once applied to the substrate, the photo-polymerizable anisotropic material present in the photo-polymerizable coating composition can be at least partially ordered. The photo-polymerizable anisotropic material present in the photo-polymerizable coating composition can be at least partially ordered by exposure to a magnetic field, an electric field, linearly polarized infrared radiation, linearly polarized ultraviolet radiation, linearly polarized visible radiation, shear force, or combinations thereof.

Alternatively or additionally, the photo-polymerizable anisotropic material can be at least partially ordered by aligning at least a portion of the anisotropic material with another material or structure. For example, the photo-polymerizable anisotropic material can be at least partially ordered by aligning the anisotropic material with an alignment layer (or an orientation facility) such as, but not limited to, those alignment layers as described in further detail herein below.

By ordering at least a portion of the photo-polymerizable anisotropic material, it is possible to at least partially align at least a portion of the photochromic-dichroic dye and/or the dichroic dye that is a component of the photo-polymerizable coating composition. Although not required, the photochromic-dichroic dye can be at least partially aligned while in an activated state.

The photochromic-dichroic dye and the photo-polymerizable anisotropic material can be aligned and ordered during application of the anisotropic layer. For example, the photo-polymerizable coating composition comprising the photo-polymerizable anisotropic material can be applied using a coating technique that introduces a shear force to the anisotropic material during application, such that the anisotropic material becomes at least partially ordered generally parallel to the direction of the applied shear force. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the anisotropic material in this manner, at least a portion of the photochromic-dichroic dye and/or the dichroic dye can be aligned. In addition, and optionally, by exposing at least a portion of the photochromic-dichroic dye to actinic radiation during the curtain coating process, so as to convert the photochromic-dichroic dye to an activated state, at least partial alignment of the photochromic-dichroic dye while in the activated state can also be achieved.

The photo-polymerizable anisotropic material can be aligned and ordered after application of the photo-polymerizable coating composition over the substrate. For example, the photo-polymerizable coating composition can be spin-coated over at least a portion of the substrate. Thereafter, at least a portion of the photo-polymerizable anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the photo-polymerizable anisotropic material can be at least partially ordered by alignment thereof with another material or structure, such as an alignment layer.

As used herein, the term "alignment layer" means a layer that can facilitate the positioning of one or more other structures that are exposed, directly and/or indirectly, to at least a portion thereof. As used herein, the term "order" means bring into a suitable arrangement or position, such as aligning with another structure or material, or by some other force or effect. Thus, as used herein, the term "order" encompasses both contact methods of ordering a material, such as by aligning with another structure or material, and non-contact methods of ordering a material, such as by exposure to an external force or effect. The term "order" also encompasses combinations of contact and non-contact methods.

For example, a photochromic-dichroic dye or a dichroic dye that is at least partially aligned by interaction with the alignment layer can be at least partially aligned such that the long-axis of the photochromic-dichroic dye (when in the activated state) and/or the dichroic dye is essentially parallel to at least the first general direction of the alignment layer. The photochromic-dichroic dye that is at least partially aligned by interaction with the alignment layer can be bound to or reacted with the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

The alignment layer can have at least a first general direction. For example, the alignment layer can include a first ordered region having a first general direction and at least one second ordered region adjacent the first ordered region having a second general direction that is different from the first general direction. Further, the alignment layer can have a plurality of regions, each of which has a general direction that is the same or different from the remaining regions so as to form a desired pattern or design. The alignment layer can include, for example, a coating including an at least partially ordered alignment medium, an at least partially ordered polymer sheet, an at least partially treated surface, Langmuir-Blodgett films, and combinations thereof.

The alignment layer can include a coating that includes an at least partially ordered alignment medium. Examples of suitable alignment media that can be used in conjunction with the alignment layer include, but are not limited to, photo-orientation materials, rubbed-orientation materials, and liquid crystal materials. Methods of ordering at least a portion of the alignment medium are described herein below in further detail.

The alignment medium of the alignment layer can be a liquid crystal material, and the alignment layer can be referred to as a liquid crystal alignment layer. Liquid crystal materials, because of their structure, are generally capable of being ordered or aligned so as to take on a general direction. Liquid crystal materials suitable for use in preparing the alignment layer can include any of those discussed previously in reference to the photo-polymerizable anisotropic material.

Examples of photo-orientation materials, that can be included in the alignment layer, include, but are not limited to, photo-orientable polymer networks. More specific examples of photo-orientable polymer networks include, but are not limited to, azobenzene derivatives, cinnamic acid derivatives, coumarin derivatives, ferulic acid derivatives, and polyimides. With some embodiments, the alignment layer can include an at least partially ordered photo-orientable polymer network chosen from azobenzene derivatives, cinnamic acid derivatives, coumarin derivatives, ferulic acid derivatives, and/or polyimides. Examples of cinnamic acid derivatives, that can be included in the alignment layer, include, but are not limited to, polyvinyl cinnamate and polyvinyl esters of paramethoxycinnamic acid.

As used herein, the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be included in the alignment layer, include, but are not limited to, (poly)imides, (poly)siloxanes, (poly)acrylates, and (poly)coumarins. With some embodiments, the alignment layer can include a polyimide, and the alignment layer can be rubbed with a velvet or a cotton cloth so as to at least partially order at least a portion of the surface of the alignment layer.

Further, the alignment layer can include an at least partially ordered polymer sheet. For example, a sheet of polyvinyl alcohol can be at least partially ordered by stretching (e.g., uniaxially stretching) the sheet, and there-after the stretched sheet can be bonded to the at least a portion of a surface of the optical substrate to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, by exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The alignment layer can include an at least partially treated surface. As used herein, the term "treated surface" refers to at least a portion of a surface that has been physically altered to create at least one ordered region on at least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the surface of the alignment layer can be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

When the alignment layer includes a treated surface, the treated surface can be formed by depositing a metal salt (such as a metal oxide or metal fluoride) onto at least a portion of a surface (e.g., a surface of the alignment layer itself, or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

As used herein, the term "Langmuir-Blodgett films" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term molecular film refers to monomolecular films (i.e., monolayers) as well as films comprising more than one monolayer.

Any of the coated articles of the present invention described above can further include an alignment transfer material interposed between the alignment layer and the layer formed from the photo-polymerizable coating composition. The alignment transfer material can be aligned by interaction with the alignment layer, and correspondingly the photo-polymerizable anisotropic material and, if present, the photochromic-dichroic compound and/or dichroic compound can be aligned by interaction with the alignment transfer material. The alignment transfer material can facilitate the propagation or transfer of a suitable arrangement or position from the alignment layer to the photochromic-dichroic compound of the photochromic-dichroic layer.

Examples of alignment transfer materials include, but are not limited to, those liquid crystal materials described above. It is possible to align the molecules of a liquid crystal material with an oriented surface. For example, a liquid crystal material can be applied to a surface that has been oriented and subsequently aligned such that the long axis of the liquid crystal molecules adopts an orientation that is generally parallel to the same general direction of orientation of the surface. The liquid crystal material of the alignment transfer material can be at least partially ordered by alignment with the alignment layer, such that the long axis of the molecules of the liquid crystal material are generally parallel to, for example, a first general direction of the orientation facility. In this manner, the general direction of the alignment layer can be transferred to the liquid crystal material, which in turn can transfer the general direction to another structure or material. Further, if the alignment layer includes a plurality of regions having general directions that together form a design or pattern, that design or pattern can be transferred to the liquid crystal material by aligning the liquid crystal material with the various regions of the alignment layer. Additionally, although not required, at least a portion of the liquid crystal material of the alignment transfer material can be exposed to at least one of a magnetic field, an electric field, linearly polarized infrared radiation, linearly polarized ultraviolet radiation, and linearly polarized visible radiation while being at least partially aligned with at least a portion of the alignment layer.

Once the anisotropic material present in the photo-polymerizable coating composition has been ordered, the ordered photo-polymerizable coating composition is exposed to a light emitting diode light source having a peak emission wavelength ranging from 385 to 460 nanometers, such as from 390 to 460 nanometers, or from 410 to 460 nanometers, to effect cure (i.e., polymerization) of the photo-polymerizable coating composition. For photo-polymerizable coating compositions comprising photochromic-dichroic dyes, the peak emission wavelength of the light emitting diode light source is preferentially selected to have minimal overlap with the absorbance of the unactivated state of the photochromic dyes while still overlapping with the absorbance of the selected photoinitiator(s). Minimal overlap of the emission with the dye absorbance helps to ensure good through-cure and limits the potential for light to degrade the dyes during cure of the coating. With photo-polymerizable coating compositions comprising photochromic dyes, longer wavelength or lower energy peak emission wavelengths generally are used, provided they still overlap sufficiently with the absorbance of the selected photoinitiator(s). It has been found that longer wavelength light typically causes less degradation of the dyes and other coating materials.

The light emitting diode light source can be an organic light emitting diode; and/or an inorganic light emitting diode, for example those made using alloys of some or all of aluminum nitride, gallium nitride, and indium nitride. Commercially available light sources incorporating suitable inorganic light emitting diodes include LB80-438P1-84 or JL3-395-G2-12 units from Clearstone Technologies, Inc. Commercially available light sources incorporating suitable inorganic light emitting diodes are also available from Heraeus Noblelight America LLC or Phoseon Technology.

As would be understood by one skilled in the art, the exposure time (i.e., irradiation time) required to effect cure of the photo-polymerizable coating composition will vary dependent on the nature and amounts of the components present in the photo-polymerizable coating composition, the thickness of the applied coating layer, and the specific wavelength and intensity of the light emitting diode light source.

As previously mentioned, the photoinitiator present in the photo-polymerizable coating composition should be capable of activation at the peak emission wavelength of the light emitting diode light source to ensure sufficient polymerization of the coating composition components. Moreover, since the unactivated state of photochromic compounds absorb certain wavelengths of actinic radiation, the absorption wavelength(s) of any photochromic compounds and/or photochromic-dichroic compounds that may be included in the photo-polymerizable coating composition generally have no or very little overlap with the peak emission wavelength of the light emitting diode light source.

For example, when the photo-polymerizable coating composition further comprises a photochromic compound and/or a photochromic-dichroic compound, the light emitting diode light source can have a peak emission wavelength ranging from 410 to 460 nanometers to minimize overlap between the emission wavelength of the light emitting diode light source and the absorbance of the unactivated state of the photochromic compound and/or photochromic-dichroic compound.

The coated articles prepared by the method of the present invention optionally can include one or more layers in addition to the photo-polymerizable coating composition layer(s) and any alignment layers applied to the substrate prior to application of the photo-polymerizable coating composition layer(s). Examples of such additional layers can include, but are not limited to, primer coatings and films (typically applied to the substrate surface(s) prior to deposition of the photo-polymerizable coating composition); protective coatings and films (applied before or after deposition of the photo-polymerizable coating composition to a substrate surface, including transitional coatings and films, and abrasion resistant coatings and films; anti-reflective coatings and films; photochromic coatings and films, polarizing coatings and films; and combinations thereof. As used herein, the term "protective coating or film" refers to coatings or films that can prevent wear or abrasion, provide a transition in properties from one coating or film to another, protect against the effects of polymerization reaction chemicals and/or protect against deterioration due to environmental conditions, such as moisture, heat, ultraviolet light, oxygen, etc.

As used herein, the term "transitional coating and film" means a coating or film that aids in creating a gradual change in properties or compatibility between two coatings or films, or a coating and a film. For example, although not limiting herein, a transitional coating can aid in creating a gradual change in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein, the term "abrasion-resistant coating and film" refers to a protective polymeric material that demonstrates a resistance to abrasion that is greater than a standard reference material, e.g., a polymer made of CR-39® monomer available from PPG Industries, Inc., as tested in a method comparable to ASTM F-735 Standard Test Method for Abrasion Resistance of Transparent Plastics and Coatings Using the Oscillating Sand Method. Non-limiting examples of abrasion-resistant coatings can include, but are not limited to, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT® and HI-GARD® coatings, available from SDC Coatings, Inc. and PPG Industries, Inc., respectively.

The abrasion-resistant coating or film (often referred to as a hard coat) can, with some aspects, be selected from art-recognized hard coat materials, such as organosilane abrasion-resistant coatings. Organosilane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organosilane hard coatings and which disclosures are incorporated herein by reference. Reference is also made to U.S. Pat. Nos. 4,731,264, 5,134, 191, 5,231,156, and International Patent Publication No. WO 94/20581 for disclosures of organosilane hard coatings, which disclosures are also incorporated herein by reference. The hard coat layer can be applied by art-recognized coating methods such as, but not limited to, roll coating, spray coating, curtain coating, and spin coating.

Non-limiting examples of suitable antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of suitable conventional photochromic coatings and films include, but are not limited to, coatings and films comprising conventional photochromic materials.

The method of the present invention can be used to prepare any of a number of coated articles such as any of the optical elements selected from the group consisting of ophthalmic articles, display articles, windows, and mirrors. Preparation of liquid crystal cells also is contemplated. The method is especially useful for the preparation of ophthalmic articles selected from corrective lenses, non-corrective lenses, contact lenses, and protective lenses. Preparation of visors, face-shields, intraocular lenses, and magnifying lenses also is contemplated.

The present invention relates, for example, without being limited thereto, to the following aspects.

In a first aspect, the present invention may relate to a method for preparing a coated article, the method comprising: (a) providing a substrate; (b) applying a photo-polymerizable coating composition to at least a portion of the substrate, the photo-polymerizable coating composition comprising: (1) a photo-polymerizable anisotropic material, and (2) a photoinitiator; (c) ordering the anisotropic material present in the photo-polymerizable coating composition; and (d) exposing the ordered photo-polymerizable coating composition of (c) to a light emitting diode light source having a peak emission wavelength ranging from 385 to 460 nanometers to cure the photo-polymerizable coating composition, wherein the photoinitiator is capable of activation at the peak emission wavelength of the light emitting diode light source.

In a second aspect of the present invention, in the method of the first aspect of the present invention, the photo-polymerizable coating composition further comprises a material selected from the group consisting of a photochromic compound, a dichroic compound, a photochromic-dichroic compound, and mixtures thereof.

In a third aspect of the present invention, in the method as described above for the first or second aspects, the photo-polymerizable coating composition further comprises a photochromic compound and/or a photochromic-dichroic compound, and the light source has a peak emission wavelength ranging from 410 to 460 nanometers.

In a fourth aspect of the present invention, in the method according to any one of the preceding first to third aspects, the substrate of (a) comprises a polymeric material selected from the group consisting of polycarbonate, polycyclic alkene, polyurethane, poly(urea)urethane, polythiourethane, polythio(urea)urethane, poly(allyl carbonate) polymers, cellulose acetate, cellulose diacetate, cellulose triacetate, cellulose acetate propionate, cellulose acetate poly(vinylidene chloride), poly(ethylene terephthalate), polyester, polysulfone, polyolefin, copolymers thereof, and mixtures thereof.

In a fifth aspect of the present invention, in the method according to any one of the preceding first to fourth aspects, the photo-polymerizable coating composition is applied by an application method selected from the group consisting of spin coating, spray coating, ultrasonic spray coating, curtain coating, dip coating, roll coating, flow coating, wire coating, overlaying, and combinations thereof.

In a sixth aspect of the present invention, in the method according to any one of the preceding first to fifth aspects, the photo-polymerizable anisotropic material present in the photo-polymerizable coating composition comprises a photo-polymerizable liquid crystal monomer.

In a seventh aspect of the present invention, in the method according to any one of the preceding first to sixth aspects, the photo-polymerizable anisotropic material present in the photo-polymerizable coating composition is at least partially ordered by exposure to a magnetic field, an electric field, linearly polarized infrared radiation, linearly polarized ultraviolet radiation, linearly polarized visible radiation, shear force, or combinations thereof.

In an eighth aspect of the present invention, in the method according to any one of the preceding first to seventh aspects, the photoinitiator is selected from the group consisting of phosphine based photoinitiators, benzoyl based photoinitiators, substituted benzoyl based photoinitiators, and mixtures thereof.

In a ninth aspect of the present invention, in the method according to any one of the preceding first to eighth aspects, the substrate of (a) comprises one or more coating layers thereover, prior to application of the photo-polymerizable coating composition.

In a tenth aspect of the present invention, in the method according to the preceding ninth aspect, the substrate (a) comprises at least an alignment facility layer thereover, prior to application of the photo-polymerizable coating composition. In an eleventh aspect of the present invention, in the method according to any one of the preceding first to tenth aspects, the coated article is an optical element selected from the group consisting of ophthalmic articles, display articles, windows, and mirrors.

In a twelfth aspect of the present invention, in the method according to the preceding eleventh aspect, the coated article is an ophthalmic article selected from corrective lenses, non-corrective lenses, contact lenses, and protective lenses.

In a thirteenth aspect of the present invention, in the method according to any one of the preceding first to twelfth aspects, the light emitting diode light source is an organic light emitting diode.

In a fourteenth aspect of the present invention, in the method according to any one of the preceding first to twelfth aspects, the light emitting diode light source is an inorganic light emitting diode.

The present invention is described in the following illustrative, non-limiting examples. Numerous possible modifications and variations will be apparent to those skilled in the art.

Examples

Part 1: Preparation of Photo-Polymerizable Coating Compositions Comprising Photo-Polymerizable Anisotropic Materials and Photoinitiators Coatings A Through E Five photo-polymerizable coating compositions, Coatings A through E, comprising photo-polymerizable anisotropic materials and photoinitiators were prepared as described below using the materials listed in the following TABLE 1. The amounts listed are in parts by weight.

For each coating, the materials of Charge 1 were combined in an amber jar equipped with a magnetic stir bar and stirred at room temperature for a minimum of two hours until the composition appeared homogenous. Next, for Coatings A, B, and C, the materials indicated in TABLE 1 for Charge 2 were added and the combined materials were stirred on a hot plate set to 90° C. for one hour. There was no Charge 2 addition or heating step for Coatings D and E. Charge 3 was added next and then the combined materials stirred on a hot plate set to 90° C. for one hour. Charge 4 was added and the combined materials were stirred on a hot plate set to 65° C. for thirty minutes. After cooling, Charge 5 was added and the mixture was stirred at room temperature for approximately thirty minutes. Each of the resulting coating mixtures was then passed through a polyvinylidene fluoride filter with a 5.0 micron pore size before use.

TABLE 1

Composition of Coatings A-E (parts by weight)

| Material | Coating A | Coating B | Coating C | Coating D | Coating E |
|---|---|---|---|---|---|
| Charge 1 | | | | | |
| BYK-322[1] | 0.067 | 0.067 | 0.067 | 0.067 | 0.067 |
| 4-methoxyphenol | 0.100 | 0.100 | 0.100 | 0.100 | 0.100 |
| anisole | 66.53 | 66.53 | 66.50 | 66.50 | 66.50 |
| Charge 2 | | | | | |
| PC Dye Blend[2] | 12.00 | 12.00 | 0 | 0 | 0 |
| Fixed Tint Dye[3] | 0 | 0 | 4.00 | 0 | 0 |
| Charge 3 | | | | | |
| RM-257[4] | 42.00 | 42.00 | 42.00 | 42.00 | 42.00 |
| LCM-2[5] | 22.00 | 22.00 | 22.00 | 22.00 | 22.00 |
| LCM-3[6] | 18.00 | 18.00 | 18.00 | 18.00 | 18.00 |
| LCM-4[7] | 18.00 | 18.00 | 18.00 | 18.00 | 18.00 |
| Charge 4 | | | | | |
| phenylbis(2,4,6-trimethylbenzoyl)phosphine oxide | 1.50 | 0 | 1.50 | 1.50 | 0 |
| 2-hydroxy-2-methylpropiophenone | 0 | 1.18 | 0 | 0 | 1.18 |
| Charge 5 | | | | | |
| Anhydrous MgSO$_4$ | 18.02 | 17.98 | 17.21 | 16.81 | 16.76 |

[1]An aralkyl-modified polymethylalkylsiloxane available from BYK Chemie, USA.
[2]A mixture of three photochromic-dichroic indenofused napthopyran dyes formulated to give a grey color when activated (hereinafter referred to as "PC Dye Blend").
[3]A blue fixed-tint dichroic dye.
[4]The liquid crystal monomer 4-(3-acryloyloxypropyloxy)-benzoic acid 2-methyl-1,4-phenylene ester, available commercially from EMD Chemicals, Inc.
[5]4-((4-((8-((6-((6-((6-((6-((6-((6-((6-(methacryloyloxy)hexanoyl)oxy)hexanoyl)oxy) hexanoyl)oxy)hexanoyl)oxy)hexanoyl)oxy)hexanoyl)oxy)hexanoyl)oxy) octyl)oxy)benzoyl)oxy)phenyl 4′-pentyl-[1,1′-bi(cyclohexane)]-4-carboxylate, prepared according to procedures described in U.S. Pat. No. 7,910,019 B2.
[6]1-(6-(6-(6-(6-(6-(6-(6-(8-(4-(4-(4-(6-acryloyloxyhexyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexanol, prepared in accordance with Example 17 in U.S. Pat. No. 7,910,019 B2.
[7]3-methyl-4-((4-pentylcyclohexane-1-carbonyl)oxy)phenyl 4-((6-(acryloyloxy)hexyl)oxy)benzoate.

Part 2: Measurement of Photoinitiator and PC Dye Blend Absorbance Spectra

The absorbance spectra of the PC Dye Blend, the phenylbis(2,4,6-trimethylbenzoyl)phosphine oxide photoinitiator, and the 2-hydroxy-2-methylpropiophenone photoinitiator were characterized to aid in explaining the results of some of the following examples. A solution was prepared of the PC Dye Blend at 10.6% wt. in anisole, then diluted by a factor of two thousand before the absorbance was measured in a quartz one centimeter path length cell. The measured absorbance spectrum is depicted in FIG. 1, Spectrum 1.

Figure 2:
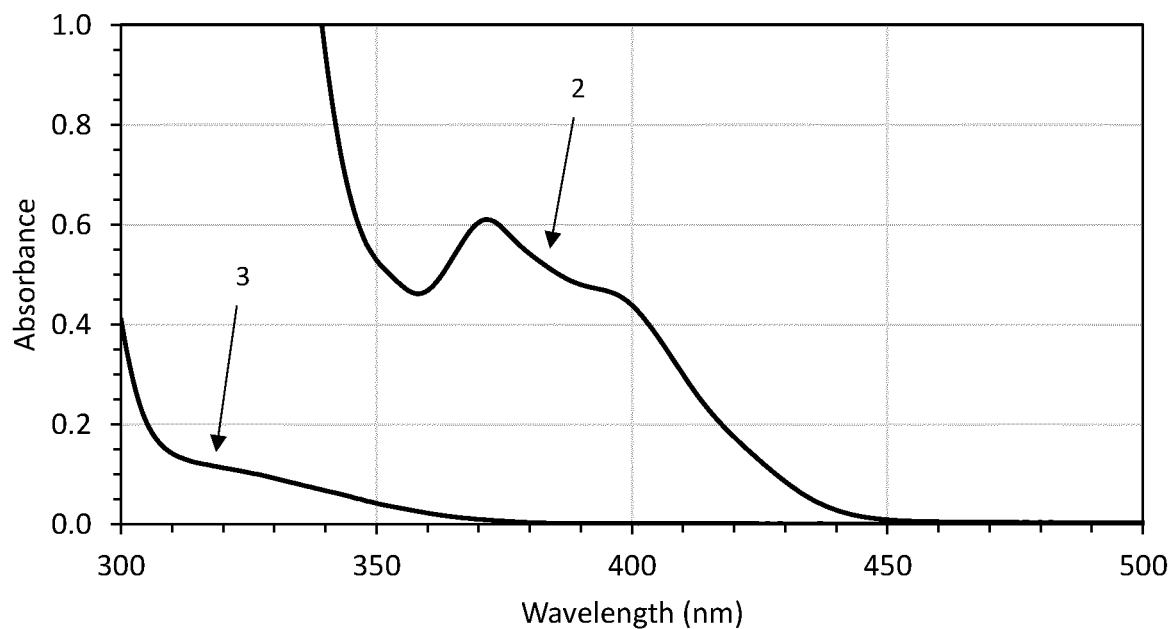
FIG. 2 depicts the absorbance spectra (Spectra 2 and 3) of photoinitiators phenylbis(2,4,6-trimethylbenzoyl)phosphine oxide and 2-hydroxy-2-methylpropiophenone, respectively.

A solution of phenylbis(2,4,6-trimethylbenzoyl)phosphine oxide was prepared at 1.32% wt. in anisole and then diluted by a factor of fifty before the absorbance was measured in a quartz one centimeter path length cell. The measured absorbance spectrum is depicted in FIG. 2, Spectrum 2. Similarly, a solution of 2-hydroxy-2-methylpropiophenone was prepared at 1.04% wt. in anisole and then diluted by a factor of fifty before the absorbance was measured in a quartz one centimeter path length cell. The measured absorbance is depicted in FIG. 2, Spectrum 3.

Absorbance measurements were performed using a Cary Series UV-Visible spectrophotometer from Agilent Technologies, Inc. The instrument was set with the following parameters: scan speed=600 nm/min; data interval=1.0 nm; integration time=100 ms; SBW(slit bandwidth)=2.0. A 1 cm quartz cuvette filled with anisole was used to perform a baseline correction and to zero the instrument. The solutions were tested at ambient room temperature (23±3° C.). The solution with the PC Dye Blend was kept in an amber vial prior to the measurement to avoid activation of the dyes.

Part 3: Preparation of coated test samples Finished plano lenses prepared from CR-39® monomer (6 base, 65 mm diameter) were used as substrates for all coated articles. The lenses were cleaned by wiping with a paper cloth dampened with acetone and then air-dried. Next, each lens was corona treated with a Power Generator HV 2000 (serial no. 020270) from Tantec EST Inc. set at 70 kV and 1000 W with a belt speed of 3 ft/m in.

After the corona treatment, a photoalignment coating, prepared as described in Example 1 of U.S. Pat. No. 9,475,901, the synthesis of which is herein incorporated by reference, was applied to each lens via a spin coating process. Approximately 1.5 mL of the photoalignment coating was applied to a portion of the lens surface. The lens was spun using a spin processor from Laurell Technologies Corp. (WS-650MZ-23NPPB) at 800 revolutions per minutes (rpm) for two seconds, followed by 1,000 rpm for seven seconds, followed by 2,500 rpm for four seconds. Next, each coated lens was placed in a forced air convection oven set at 80° C. for approximately thirteen minutes.

The lenses were cooled, then each lens was exposed to linearly polarized ultraviolet light. The light source was positioned such that the light was polarized in a plane perpendicular to the top surface of the lens. The energy density that each photoalignment coating was exposed to was measured using a UV Power Puck™ II high energy radiometer (S/N:18938) from Uvitron International, Inc. The measured energy densities were in the following ranges: UV-V of 4.6 to 5.0 J/cm$^2$, UV-A of 3.7 to 4.1 J/cm$^2$, UV-B of 0.12 to 0.14 J/cm$^2$, and UV-C of 0.12 to 0.19 J/cm$^2$.

Next, each of the photo-polymerizable coatings, Coatings A through E, was applied to a lens via a spin coating process. The coating composition used for each example and comparative example is indicated in the following TABLES 2 through 4. In each instance, approximately 1.5 mL of coating was applied to a portion of the lens surface. The lens was spun using a spin processor from Laurell Technologies Corp. (WS-650MZ-23NPPB) at 400 rpm for 6 seconds, followed by 900 rpm for 4 seconds. Each coated lens then was placed in a forced air convection oven set at 65° C. for thirty minutes.

For Examples 1, 2, 5, 6, 8, and 9 as well as Comparative Examples 11 and 12, each coated lens was then placed in a nitrogen purged chamber with a borosilicate glass window. A light emitting diode light source was positioned directly above the window at an incidence angle perpendicular to the lens surface and a distance of approximately 7 centimeters (cm). After each lens was cooled for three minutes in the nitrogen purged chamber, the light emitting diode light source was turned on to irradiate the coated lens surface. As indicated in TABLES 2 through 4 below, a light emitting diode light source with a peak emission wavelength of either 395 nm or 438 nm was used. The energy density each light source emitted was measured using a UV Power Puck™ II high energy radiometer (S/N:18938) from Uvitron International, Inc. Lenses irradiated with the light emitting diode light source with a 395 nm peak emission wavelength were exposed to energy densities of UV-V of 55.9 to 62.9 J/cm$^2$ and UV-A of 1.8 to 2.3 J/cm$^2$ over the course of a 90 second exposure. Lenses cured with the light emitting diode light source with a 438 nm peak emission wavelength were exposed to energy densities of UV-V of to 15.4 J/cm$^2$ over the course of a 60 second exposure.

For Comparative Examples 3, 4, 7, 10 and 13, the coated lenses were cooled for three minutes. Using a conveyor system, the lenses were then passed through a nitrogen purged chamber fitted with a series of D Type bulbs positioned above glass windows on the top of the chamber. The glass windows had high transmissivity for ultraviolet and visible light. Each coating was exposed to an energy density measured using a UV Power Puck™ II high energy radiometer (S/N:18938) from Uvitron International, Inc. as follows: UV-V of 16.3 J/cm$^2$, UV-A of 17.1 J/cm$^2$, UV-B of 4.0 J/cm$^2$, and UV-C of 0.7 J/cm$^2$.

Finally, all lenses were placed in a forced air convection oven set to 105° C. for three hours.

Part 4: Properties of Coated Test Samples

Each coated lens was first visually inspected for cure of the photo-polymerizable layer. The coating of Comparative Example 4 was observed to have an uneven, wavy top surface and cracks in the coating. The coatings of Comparative Examples 11 and 12 did not cure. These coatings remained liquid and could be easily wiped off. The other coatings appeared to be cured upon visual inspection.

Except for Comparative Examples 4, 11, and 12, the photo-polymerizable coatings were tested for their microhardness using a FISCHERSCOPE® HM2000 S nanoindentation system available from Fisher Technology, Inc. The hardness was measured at a depth of 2 microns using a 100 milliNewton load for 15 seconds. Each coating was measured three times. The averaged results are reported in TABLES 2 through 4 below for the photochromic-dichroic lenses, fixed-tint dichroic lenses, and dye-free lenses, respectively.

The photochromic performance properties of the coated lenses of Examples 1 and 2 and Comparative Example 3 were tested according the following procedure. Prior to response testing on an optical bench, the test specimens were conditioned in a multistep custom-built conditioning unit. First, they were exposed to 365 nm ultraviolet light for 10 minutes at a distance of about 10 cm from the source of electromagnetic radiation, in order to pre-activate the photochromic compounds. The UVA irradiance at the sample was measured to be 7.7 Watts per square meter. Next, the test specimens were heated to and held at a temperature of 70° F. (21.1° C.) for 10 minutes. Finally, the heating element was turned off and F17T8 Yellow Halogen lights were turned on for 30 minutes in order to bleach, or inactivate, the photochromic compounds in the test specimens. The illuminance from the yellow halogen lights at the test specimen was measured to be 9.0 Klux. The test specimens were then kept in a dark environment for 1 hour prior to testing in order to cool and continue to fade back to a ground state.

An optical bench was used to measure the optical properties of the test specimens and to derive the absorption ratio and photochromic properties. Each test specimen was placed on the optical bench with an activating light source positioned at a +/−1° angle of incidence to the surface of the test sample. The activating light source used was a Xenon Arc Lamp powered by a Newport/Oriel Model 69911 300-Watt power supply fitted with a UNIBLITZ® VS-25 high-speed computer controlled shutter that momentarily closed during data collection so that stray light would not interfere with the data collection process, a SCHOTT® 3 mm KG-2 heat absorbing filter, which removed short wavelength radiation, neutral density filter(s) for intensity attenuation, and a condensing lens for beam collimation. The arc lamp was equipped with a Digital Exposure Controller and sensor (Newport/Oriel model 68945) in order to maintain fine control of the output over time.

A broadband light source for monitoring response measurements was positioned perpendicular to the surface of each test specimen. Increased signal of shorter visible wavelengths was obtained by collecting and combining separately filtered light from a 100-Watt tungsten halogen lamp (controlled by a LAMBDA® ZUP60-14 constant voltage power supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4- to 6-inch (10.2 to 15.25 cm) light pipe was attached to the single end of the cable to insure proper mixing. The broad band light source was fitted with a UNIBLITZ® VS-25 high-speed computer-controlled shutter that momentarily opened during data collection.

Polarization of the light source was achieved by passing the light from the single end of the cable through a Moxtek, PROFLUX® Polarizer held in a computer driven (analyzer polarizer), motorized rotation stage (Model M-061.PD, M660, U651 or equivalent from Physik Instrumente). The monitoring beam was set so that one polarization plane(0°) was perpendicular to the plane of the optical bench table and the second polarization plane(90°) was parallel to the plane of the optical bench table. The test specimens were run in air, at 23° C.±0.1° C. (which temperature was maintained by a temperature controlled air cell).

To align the test specimens, a second polarizer was added to the optical path (research grade film polarizer, such as a polarizer from OptoSigma, SPF-50C-32). The second polarizer was set to 90° (+/−0.1 degree) of the first analyzer polarizer. Each test sample was placed in an air cell in a self-centering holder mounted on a rotation stage (Model M-061.PD, M660, U651 or equivalent from Physik Instrumente). A laser beam (Coherent-ULN 635 diode laser) was directed through the crossed polarizers and sample. The signal intensity of the laser beam was measured, in relative counts by the spectrophotometer. The test specimen was rotated 120 degrees in 3 degree increments in order to locate a minimum transmitted light intensity of the laser beam. The test specimen was then positioned near the minimum transmitted light intensity and then the test specimen was rotated 12 degrees in 0.1 degree steps in order to locate the minimum transmission to +/−0.1 degree, depending upon the sample quality. The test specimen was then finally positioned at the minimum transmission angle. At this point, the test specimen was aligned either parallel or perpendicular to the Moxtek analyzer polarizer. The second polarizer and the diode laser beam were removed from the optical path. Using this process, test specimens were aligned to ±0.1 degree prior to any activation.

To conduct the measurements, each test specimen was exposed to roughly 6.7 W/m 2 of UVA from the activating light source for 15 minutes to activate the photochromic compounds. An International Light Research Spectroradiometer (Model ILT950 or ILT950FC) was used to verify exposure at the beginning of each day. Light from the monitoring source that was polarized to the 0° polarization plane was then passed through the sample and focused into a 1 inch (2.54 cm) integrating sphere, which was connected to an OCEAN OPTICS® S2000 (or comparable) spectrophotometer using a single function fiber optic cable. The spectral information, after passing through the sample, was collected using OCEAN OPTICS Drivers in conjunction with propriety software from Transitions Optical, Ltd. While the photochromic material was activated, the position of the analyzer polarizer was rotated back and forth to polarize the light from the monitoring light source to the 90° polarization plane and back. Data was collected for approximately 900 seconds at 5 second intervals during activation. For each test, rotation of the polarizers was adjusted to collect data in the following sequence of polarization planes: 0°, 90°, 90°, 0°, etc.

Using the CIE system (Colorimetry, $4^{th}$ Edition, CIE 015:2018) with a D65 illuminant and 10° observer, the Bleach State CIE Y, a*, and b* values reported in TABLE 2 were calculated from the measured initial transmission of the bleach state (unactivated state) of the lens. The CIE b* value is a measure of how yellow the lens appears. A higher CIE b* value indicates a more yellow appearance.

The polarization efficiency ("PE") values reported in TABLE 2 were calculated based on the change in optical density (DOD) from the bleach state (i.e., unactivated state) to the darkened state (i.e., activated) to remove any contributions from the unactivated lens for both polarization states, such as from reflection or unactivated state absorbance. The change in optical density was determined by establishing the initial transmittance and then opening the shutter from the xenon lamp to provide ultraviolet radiation to change the test specimen from the bleached state to an activated state. Data was collected at selected intervals of time, measuring the transmittance in the activated state, and calculating the change in optical density according to the formula: $\Delta OD = \log(\% Tb/\% Ta)$, where % Tb is the percent transmittance in the bleached state, % Ta is the percent transmittance in the activated state and the logarithm is to the base 10. From the $\Delta OD$ values measured at 90° polarization (perpendicular orientation with the analyzer polarizer, minimum transmission) and 0° polarization (parallel orientation with the analyzer polarizer, maximum transmission), the CIE Y values were determined at 90° polarization and 0° degree polarization for a D65 illuminate and 10° observer. These values, $Y_{90}$ and $Y_0$, respectively, were used to calculate the polarization efficiency according to the formula: $PE = 100*(abs(Y_0 - Y_{90})/(Y_0 + Y_{90}))$ (note that the PE value is relative to a research grade analyzer polarizer and not between 2 like sample polarizers). The PE ranges from 0 to 100 with higher values indicating better polarization efficiency.

The optical properties of Examples 5 and 6 and Comparative Example 7 were measured using the following procedure. A CARY 4000 or 6000i UV-Visible spectrophotometer equipped with a self-centering sample holder was used. The Cary WinUV 4.2 software with customized ADL functionality was used to measure the samples. A UV polarizer ("analyzer polarizer", UVD260A, available from Moxtek, Inc.) was placed in front of the light source. The instrument was set with the following parameters: scan speed=600 nm/min; data interval=1.0 nm; integration time=100 ms; absorbance range=0-6.5; y-mode=absorbance; x-mode=nanometers; and scanning range of 370 nm to 800 nm. Options were set for 3.5 SBW (slit bandwidth) and double beam mode. Baseline options were set for zero/baseline correction. A 2.5 OD neutral density filter(s) (screen or reflective ND) was used in the reference path for all scans (referred to as rear beam attenuation filters). The coated substrate samples were tested in air, at ambient room temperature (23±3° C.). Baselines were collected after the placement of the analyzer polarizer and rear beam attenuation filters.

The perpendicular and parallel orientations of each sample polarizer relative to the analyzer polarizer were determined using a rotation stage (PI M-060.PD rotation stage with M-863 controller) to control the angle between the polarizers through the use of proprietary software interfacing the Cary UV-VIS spectrophotometer to the motorized rotation stage. The absorbance of light through the polarizers was monitored at the peak absorbance wavelength while the angle of the sample was rotated. The point of maximum absorbance was identified to within ±0.1 degree of the crossed polarization state between the analyzer polarizer and the sample. At this point, the sample polarizer was perpendicular to the Moxtek analyzer polarizer. The parallel position was obtained by rotating the stage 90 degrees clockwise or counter-clockwise.

The absorbance spectra were collected at both the parallel and crossed polarization positions relative to the analyzer polarizer for each sample. Data analysis was handled using the Igor Pro software package available from WaveMetrics and proprietary code developed within Igor Pro. The spectra were loaded into the Igor Pro software package and the absorbance data was used to calculate the Y, a*, and b* values under the CIE system (Colorimetry, 4th Edition, CIE 015:2018) with a D65 illuminant and observer. The polarization efficiency was calculated at the peak absorbance wavelength of 675 nm using the following formula:

$$PE = 100*(abs(T_0 - T_{90})/(T_0 + T_{90}))$$

where $T_0$ and $T_{90}$ are the transmission values at the 675 nm absorbance peak with sample and analyzer polarizers parallel and perpendicular, respectively. PE ranges from 0 to 100 with higher values indicating better polarization efficiency. The results are given in TABLE 3 below.

The Y, a*, and b* values under the CIE system (Colorimetry, $4^{th}$ Edition, CIE 015:2018) with a D65 illuminant and 10° observer were measured for Examples 8 and 9 as well as Comparative Examples 10 and 13 with an Ultrascan PRO instrument from HunterLab. The results are reported in TABLE 4 below.

TABLE 2

| Coated Sample | Coating Used | Light Source | Microhardness $(N/mm^2)$ | Bleach Y | Bleach a* | Bleach b* | PE |
|---|---|---|---|---|---|---|---|
| Example 1 | A | 438 nm LED[8] | 45 | 85.4 | −3.2 | 4.9 | 89.5 |
| Example 2 | A | 395 nm LED[9] | 43 | 85.5 | −3.2 | 5.5 | 89.0 |
| Comparative | A | D Type | 51 | 85.0 | −4.5 | 8.6 | 83.7 |

TABLE 2-continued

| Coated Sample | Coating Used | Light Source | Microhardness (N/mm²) Y | Bleach a* | Bleach b* | Bleach PE |
|---|---|---|---|---|---|---|
| Example 3 | | Bulbs | | | | |
| Comparative Example 4 | B | D Type Bulbs | N/A[10] | N/A[10] | N/A[10] | N/A[10] N/A[10] |

[8]Light emitting diode light source with 438 nm peak emission wavelength from Clearstone Technologies, Inc. Two LB80-438P1-84 units were used with a CF3000 controller.
[9]Light emitting diode light source with 395 nm peak emission wavelength from Clearstone Technologies, Inc. One JL3-395-G2-12 unit was used with a CF3000 controller.
[10]Coating properties could not be measured. The coating had an uneven, wavy top surface and cracks.

For the photochromic-dichroic lenses of Examples 1 and 2, and Comparative Example 3, the data in TABLE 2 illustrate that coatings irradiated with the selected light emitting diode light sources with peak emission wavelengths in the 385-460 nm range (Example 1 and Example 2) instead of the conventional broadband D Type bulb light source (Comparative Example 3) produced photochromic dichroic lenses of increased bleach state clarity (higher Bleach Y), less bleach state yellowness (lower Bleach b*), and better activated state polarization efficiency (higher PE). The coatings of Examples 1 and 2, and Comparative Example 3 all cured to an acceptable hardness of 43 N/mm 2 with the cure conditions used. Among the light emitting diode light sources, the light source with the longer peak emission wavelength of 438 nm performed the best by resulting in the lowest bleach state b* and highest activated state polarization efficiency.

While not intending to be bound by any theory, the light emitting diodes with peak emission wavelengths in the 385 nm to 460 nm range used to cure coated substrates of Example 1 and Example 2 are thought to produce higher performing coatings in part because they limit degradation of the photochromic-dichroic dyes and other coating materials by selectively emitting in a lower energy wavelength range. The broadband D Type Bulb light source emits over a wide range of energies that include higher energy short wavelength ultraviolet light that can more readily degrade the dyes and other coating materials, leading to yellowing and loss of PE. While not intending to be bound to any theory, the light emitting diode in the 410 to 460 nm range with a peak wavelength of 438 nm, is thought to yield the best results because it emits light in a wavelength range beyond where the PC Dye Blend unactivated state absorbance approaches the baseline near 420 nm (see FIG. 1, Spectrum 1), but its emission still overlaps with absorbance of the selected phenylbis(2,4,6-trimethylbenzoyl)phosphine oxide photoinitiator, (see FIG. 2, Spectrum 2). As a result, light from this source minimally affects the dyes. Additionally, since the light is not absorbed or screened by the dyes it can effectively activate the photoinitiator.

Comparative Example 4 exhibited poor through-cure for a photochromic-dichroic coating. As noted above, only the top portion of the coating cured, resulting in an uneven, wavy top surface and a cracked coating. Comparative Example 4 used Coating B, which contains the 2-hydroxy-2-methylpropiophenone photoinitiator instead of the phenylbis(2,4,6-trimethylbenzoyl)phosphine oxide photoinitiator that was used in Coating A. The absorbance of 2-hydroxy-2-methylpropiophenone, (see FIG. 2, Spectrum 3) is in a region where the PC Dye Blend absorbs strongly. The strong absorbance of the PC Dye Blend in this region screens the emission from the D Type bulbs, thereby limiting activation of the 2-hydroxy-propiophenone photoinitiator near the bottom of the coating. Conversely, in Examples 1 and 2, which used Coating A, good through cure was achieved using light emitting diode light sources with peak emission wavelengths in the 385 to 460 nm region in conjunction with a photoinitiator that absorbs out to these longer wavelengths where the PC Dye Blend absorbance is reduced or near zero.

TABLE 3

| Coated Sample | Coating Used | Light Source | Microhardness (N/mm²) | Y | a* | b* | PE[11] |
|---|---|---|---|---|---|---|---|
| Example 5 | C | 438 nm LED[8] | 34 | 38.7 | −19.9 | −19.2 | 95.6 |
| Example 6 | C | 395 nm LED[9] | 35 | 37.7 | −16.6 | −17.4 | 94.2 |
| Comparative Example 7 | C | D Type Bulbs | 39 | 37.1 | −21.8 | −14.3 | 96.3 |

[11]Measured at the peak absorbance of 675 nm.

For the fixed-tint dichroic lenses prepared as described herein, the results presented in TABLE 3 above illustrate that both of the selected light emitting diode light sources (Examples 5 and 6) and the conventional broadband D Type bulb light source (Comparative Example 7) can produce fixed tint lenses with high PE and acceptable hardness of ≥34 N/mm². However, the light emitting diode light sources are preferred due to decreased yellowing, which is indicated by a more negative b* value for Examples and 6 as compared to Comparative Example 7. Similar to the photochromic-dichroic lens examples, the light emitting diode with the lowest energy peak emission wavelength of 438 nm performs the best with the least amount of yellowing. Among the light emitting diode light sources tested, it also resulted in coated samples having the highest PE.

TABLE 4

| Coated Sample | Coating Used | Light Source | Microhardness (N/mm²) | Y | a* | b* |
|---|---|---|---|---|---|---|
| Example 8 | D | 438 nm LED[8] | 36 | 91.3 | −0.2 | 0.9 |
| Example 9 | D | 395 nm LED[9] | 38 | 91.4 | −0.2 | 0.9 |
| Comparative Example 10 | D | D Type Bulbs | 44 | 90.9 | −1.7 | 4.7 |
| Comparative Example 11 | E | 438 nm LED[8] | N/A[12] | N/A[12] | N/A[12] | N/A[12] |
| Comparative Example 12 | E | 395 nm LED[9] | N/A[12] | N/A[12] | N/A[12] | N/A[12] |
| Comparative Example 13 | E | D Type Bulbs | 33 | 90.7 | −1.5 | 4.3 |

[12]No measurement could be made. The coating did not cure.

For the dye-free lenses prepared as described above, the results presented in TABLE 4 illustrate that irradiating with the selected light emitting diode light sources (Examples 8 and 9) instead of the conventional broadband D Type bulb light source (Comparative Examples 10 and 13) resulted in non-tinted lenses that were of higher clarity (higher Y) and reduced yellowness (lower b*). The results presented in TABLE 4 also illustrate that for the light emitting diode light sources, a photoinitiator must be used that has sufficient overlapping absorbance with the light emitting diode light source emission. Comparative Examples 11, 12, and 13 used 2-hydroxy-2-methylpropiophenone as the photoinitiator in the coating. The broadband D Type bulb light source cured the coating with 2-hydoxy-2-methylpropiophenone (Comparative Example 13). The light emitting diode light sources with peak emission wavelengths of 395 nm and 438 nm did not cure the coatings with 2-hydroxy-2-methylpropiophenone (see Comparative Examples 11 and 12) because the emission from these light sources does not sufficiently overlap the absorbance of 2-hydroxy-2-methylpropiophenone (see FIG. 2, Spectrum 3).

Although the present invention has been described with reference to specific details of certain embodiments thereof, it is not intended that such details should be regarded as limitations upon the scope of the invention except insofar as they are included in the accompanying claims.

Therefore we claim:

1. A method for preparing a coated article, the method comprising:
   (a) providing a substrate;
   (b) applying a photo-polymerizable coating composition to at least a portion of the substrate, the photo-polymerizable coating composition comprising:
      (1) a photo-polymerizable anisotropic material,
      (2) a photoinitiator, and
      (3) a material selected from the group consisting of a photochromic compound, a photochromic-dichroic compound, and mixtures thereof;
   (c) ordering the anisotropic material present in the photo-polymerizable coating composition; and
   (d) exposing the ordered photo-polymerizable coating composition of (c) to a light emitting diode light source having a peak emission wavelength ranging from 385 to 460 nanometers to cure the photo-polymerizable coating composition to form a through-cured coating,
   wherein the photoinitiator is capable of activation at the peak emission wavelength of the light emitting diode light source, and
   wherein the photoinitiator is selected from the group consisting of phosphine based photoinitiators, dibenzoyl diethylgermane, and mixtures thereof.

2. The method of claim 1, wherein the photo-polymerizable coating composition further comprises a dichroic compound.

3. The method of claim 1, wherein the light source has a peak emission wavelength ranging from 410 to 460 nanometers.

4. The method of claim 1, wherein the substrate of (a) comprises a polymeric material selected from the group consisting of polycarbonate, polycyclic alkene, polyurethane, poly(urea)urethane, polythiourethane, polythio(urea) urethane, poly(allyl carbonate) polymers, cellulose acetate, cellulose diacetate, cellulose triacetate, cellulose acetate propionate, cellulose acetate poly(vinylidene chloride), poly (ethylene terephthalate), polyester, polysulfone, polyolefin, copolymers thereof, and mixtures thereof.

5. The method of claim 1, wherein the photo-polymerizable coating composition is applied by an application method selected from the group consisting of spin coating, spray coating, ultrasonic spray coating, curtain coating, dip coating, roll coating, flow coating, wire coating, overlaying, and combinations thereof.

6. The method of claim 1, wherein the photo-polymerizable anisotropic material (1) present in the photo-polymerizable coating composition comprises a photo-polymerizable liquid crystal monomer.

7. The method of claim 1, wherein the photo-polymerizable anisotropic material present in the photo-polymerizable coating composition is at least partially ordered by exposure to a magnetic field, an electric field, linearly polarized infrared radiation, linearly polarized ultraviolet radiation, linearly polarized visible radiation, shear force, or combinations thereof.

8. The method of claim 1, wherein the substrate of (a) comprises one or more coating layers thereover, prior to application of the photo-polymerizable coating composition.

9. The method of claim 8, wherein the substrate (a) comprises at least an alignment facility layer thereover, prior to application of the photo-polymerizable coating composition.

10. The method of claim 1, wherein the coated article is an optical element selected from the group consisting of ophthalmic articles, display articles, windows, and mirrors.

11. The method of claim 8, wherein the coated article is an ophthalmic article selected from corrective lenses, non-corrective lenses, contact lenses, and protective lenses.

12. The method of claim 1, wherein the light emitting diode light source is an organic light emitting diode.

13. The method of claim 1, wherein the light emitting diode light source is an inorganic light emitting diode.

14. The method of claim 1, wherein the peak emission wavelength of the light emitting diode light source is selected to have minimal overlap with an absorbance of the material selected from the group consisting of photochromic compound, a photochromic-dichroic compound, and mixtures thereof in an unactivated state.

* * * * *